United States Patent

Johnson

[15] 3,694,121

[45] Sept. 26, 1972

[54] MULTIPLE INJECTION BLOW MOLDING MACHINE

[72] Inventor: Joseph A. Johnson, Brigantine, N.J.

[73] Assignee: Jomar Industries, Inc., South Brigantine, N.J.

[22] Filed: July 7, 1970

[21] Appl. No.: 52,811

[52] U.S. Cl...................................425/168, 425/249
[51] Int. Cl.............................B29f 1/00, B29d 23/03
[58] Field of Search........18/5 BM, 5 BP, 5 BJ, 5 BB, 18/5 BA, 5 BR, 20 B, 2 RM, 30 LM, 30 LT; 425/242, 246, 248, 249, 168

[56] References Cited

UNITED STATES PATENTS

| | | | |
|---|---|---|---|
| 2,853,736 | 9/1958 | Gussoni | 18/5 BJ |
| 3,100,913 | 8/1963 | De Matteo | 18/5 BJ X |
| 3,390,427 | 7/1968 | Ruekberg | 18/5 BJ |

FOREIGN PATENTS OR APPLICATIONS

| | | | |
|---|---|---|---|
| 916,327 | 1/1963 | Great Britain | 18/5 BB |

*Primary Examiner*—Robert D. Baldwin
*Assistant Examiner*—Michael O. Sutton
*Attorney*—Stowell and Stowell

[57] ABSTRACT

In an injection blow molding machine wherein an elevatable and rotatable turret that carries distinct sets of parison pins on its side faces is surrounded at angularly spaced points by parison mold stations, blow mold stations and ejection stations, the parison clamps at the parison mold stations are mechanically linked together for equalized operation and the turret is so connected to the linkage that it is lifted with the synchronized raising movement of the movable upper halves of the separable parison molds but only one-half the vertical distance thereof whereby the parison pins are equidistant of the part line between the partible halves of the parison molds and also the blow molds when the molds are open so that the pins clear the mold halves as the turret is indexed around the stations.

6 Claims, 9 Drawing Figures

INVENTOR
JOSEPH A JOHNSON

ATTORNEYS.

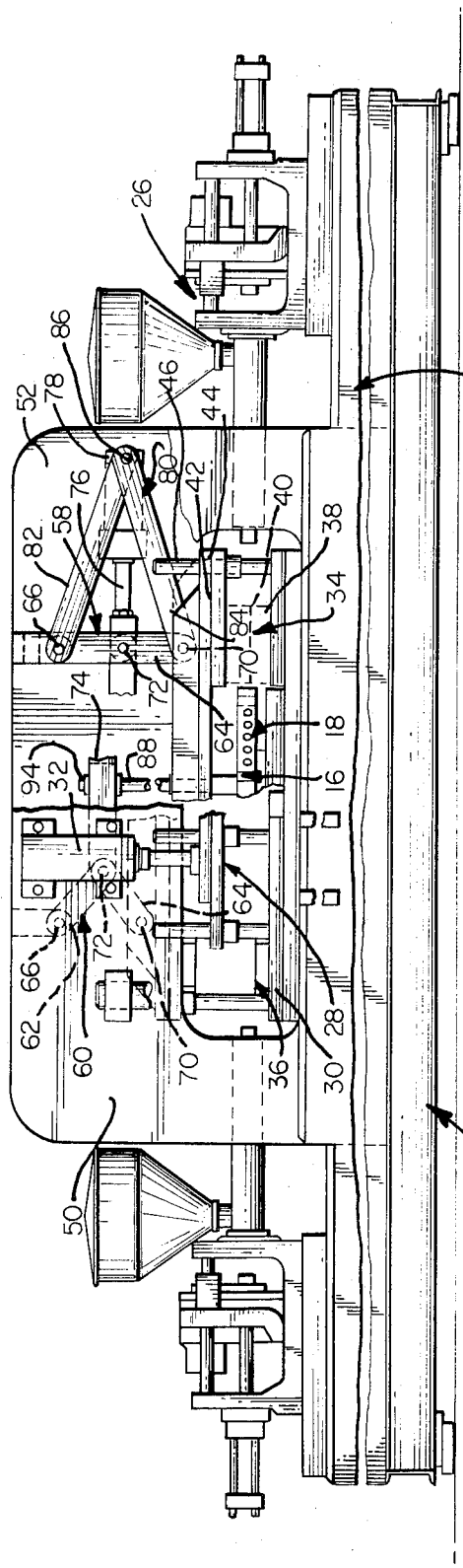

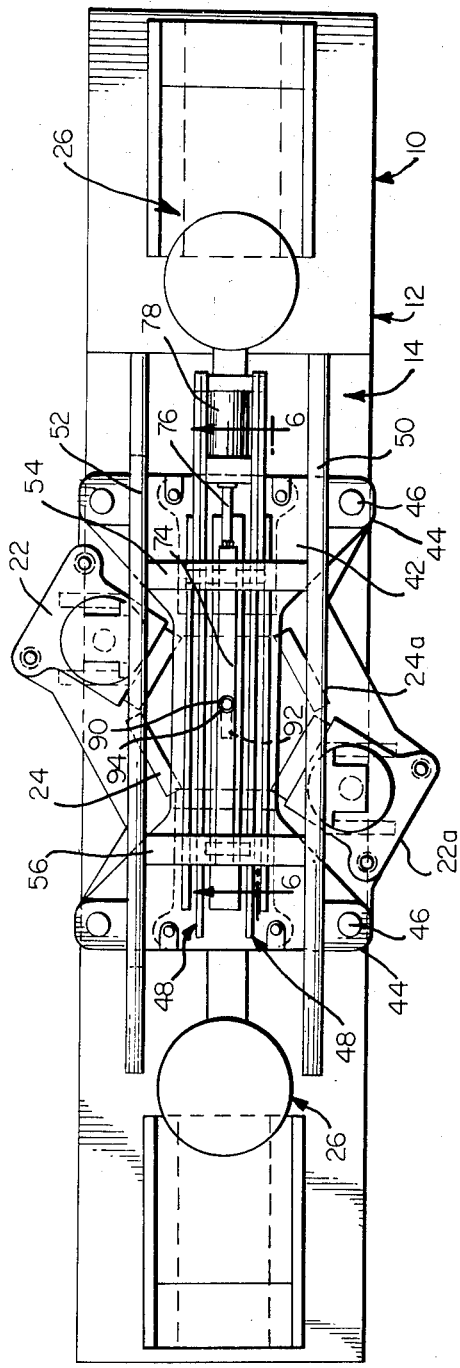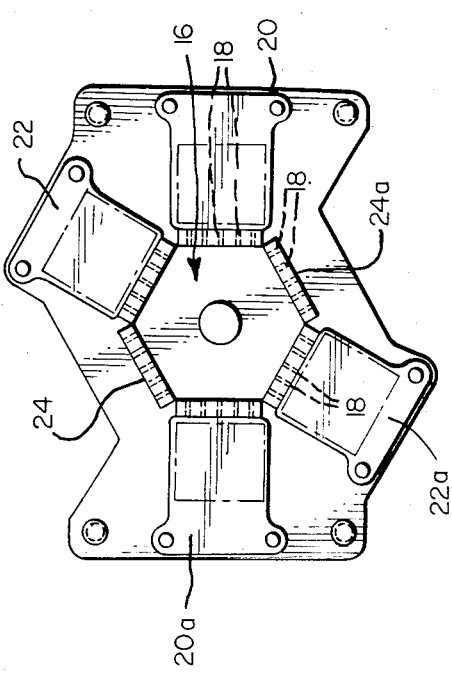
FIG. 4
FIG. 5

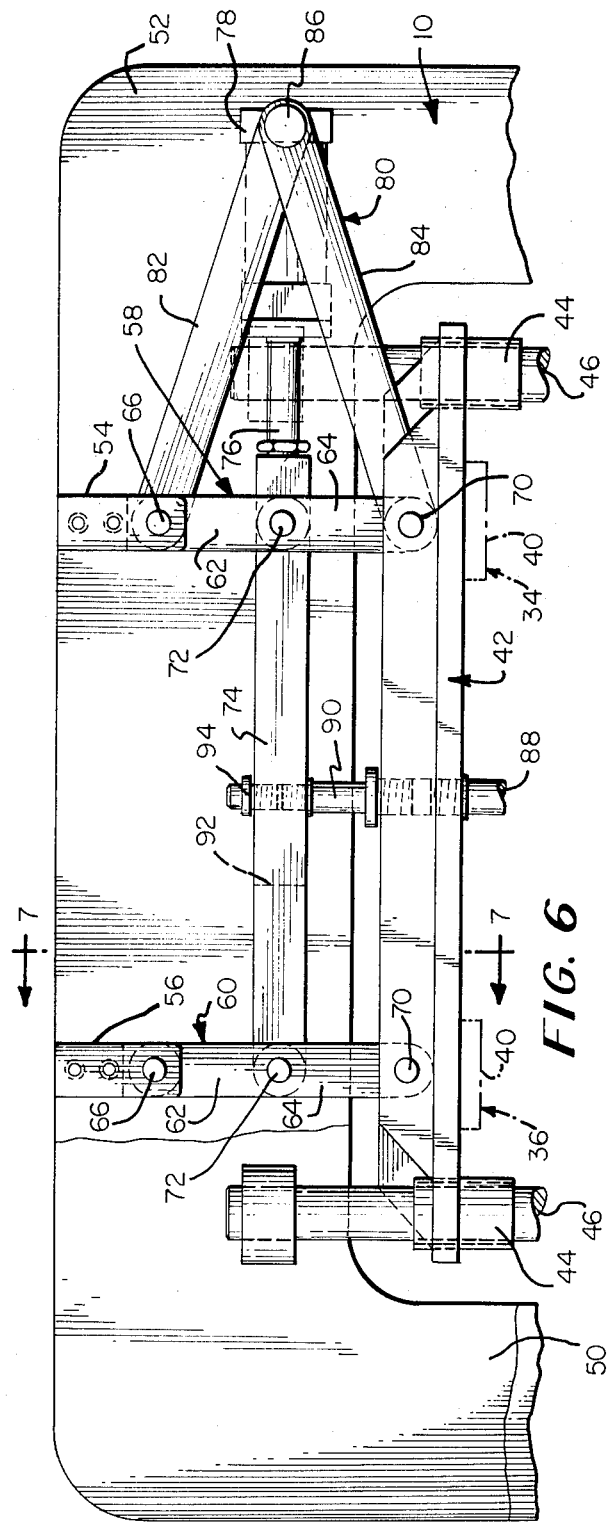
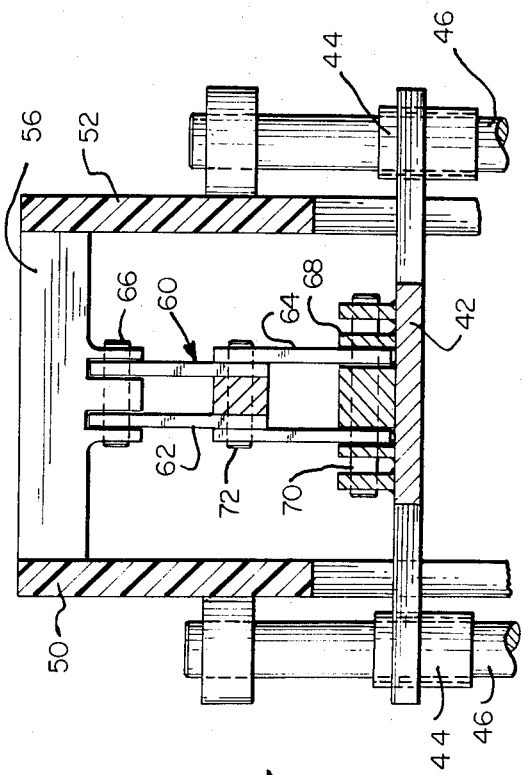
FIG. 6
FIG. 7

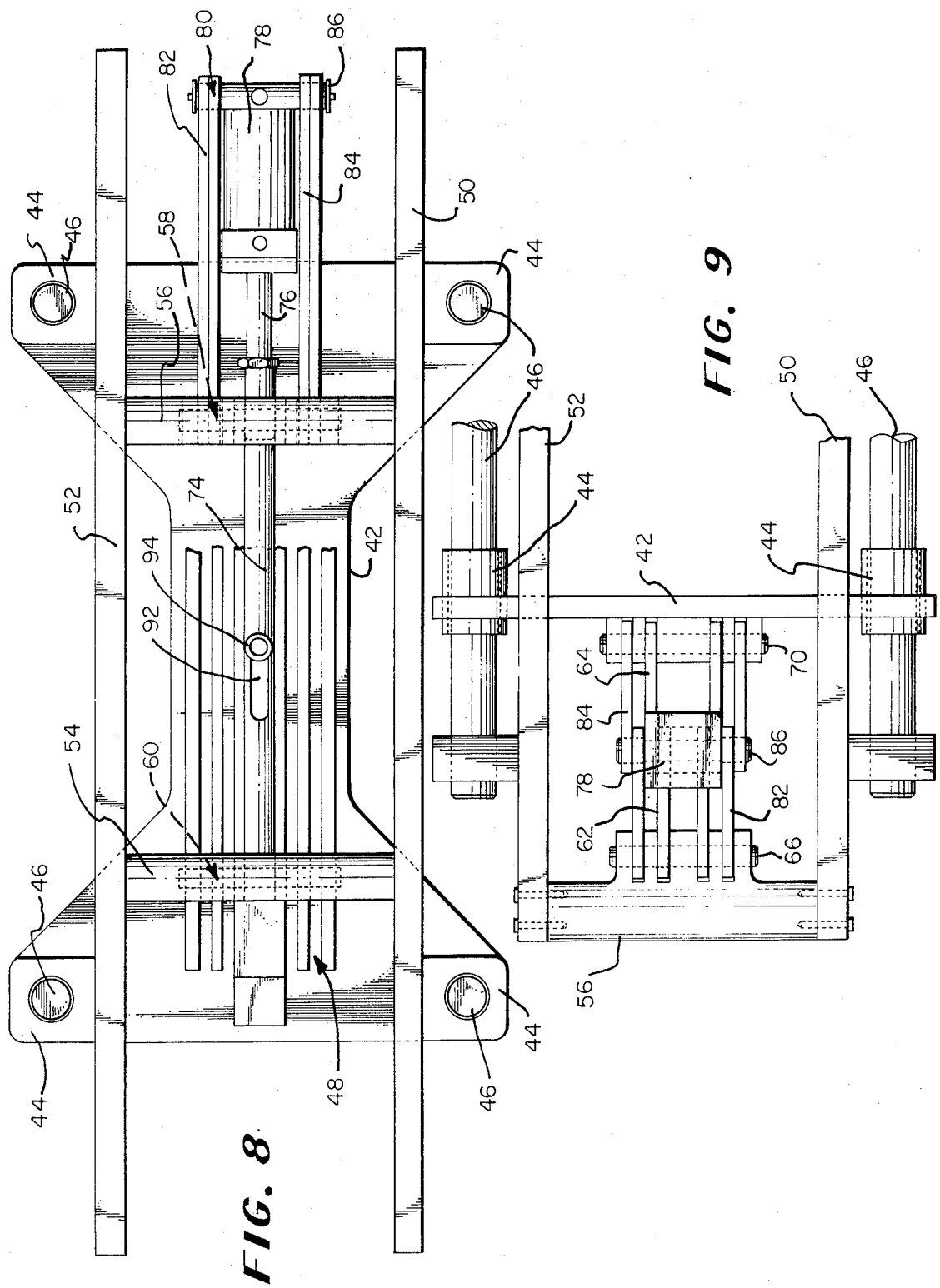

MULTIPLE INJECTION BLOW MOLDING MACHINE

Related subject matter is described and claimed in copending applications Ser. No. 52,807, filed July 7, 1970, entitled Multiple Injection Blow Molding Machine; Ser. No. 66,307, filed Aug. 24, 1970, entitled Stripper for Blow Molding Machine, and Ser. No. 66,442, filed Aug. 4, 1970, entitled Closure Device for Multiple Injection Blow Molding Machine.

BACKGROUND OF THE INVENTION

1. Field of the Invention

The present invention generally appertains to new and novel improvements in injection blow molding machines for automatically forming hollow articles, such as bottles, from plastic materials and more particularly relates to new and novel improvements in a multiple station injection blow molding machine of the type where a rotatable and elevatable parison pin carrying turret is surrounded by parison mold stations, blow mold stations and ejection stations.

2. Description of the Prior Art

One of the well known and commercially used blow molding machines of the injection type is one that has a rotatable and elevatable turret surrounded at angularly spaced points by parison mold stations, blow mold stations and ejection stations. The turret has individual side faces from which project distinct sets of parison pins. The turret is indexed to cause the sets of parison pins to operatively occupy successive stations.

Each parison or preform mold station is composed of separable mold halves with the bottom halves being fixed on a platen and the upper halves being movably carried by a lifting mechanism, usually hydraulic cylinders, that serves to clamp the mold halves about the parison pins. At each parison mold station there is an injection unit for injecting plastic melt into the closed parison molds and around the parison pins so that the parisons can be formed.

After the parisons are formed, the parison molds are opened and the turret is elevated and then rotated to bring the parisons to blow mold stations where the parisons are positioned in the blow molds, that are separable and have fixed bottom halves and elevatable upper halves. The blow molds are clamped and pressurized air is passed through the hollow parison pins to expand the parisons to the configuration determined by the interior shape and size of the blow molds.

On completion of the blow molding, the turret is elevated and indexed to bring the expanded parisons to the ejection stations where they are removed from the parison pins.

All of the stations are simultaneously operative and the turret is caused to rotate to bring the sets of pins from station to station in the order of parison forming, then blowing and finally ejecting with the pins remaining at each station for a period sufficient for the completion of the operation on the pins at such station. As aforenoted, the parison mold stations and the blow mold stations are composed of separable mold halves with the bottom halves being fixed on a platen and the upper halves being vertically movable through the agency of some lifting and clamping medium, usually hydraulic cylinders. The movable upper mold halves are raised as the turret is indexed to rotate the parison pins from one station to another station.

A main problem that has been encountered with such machines resides in the separation of the mold halves and the associated elevation and indexing of the parison pin carrying turret. Unfortunately, the mold halves open independently and the turret is elevated independently so that proper clearance for the pins relative to the molds is not always provided.

In addition, another problem which is also associated with the separable parison molds lies in the independent movement of the mold halves and clamps, usually under high pressure cylinders, that place uneven pressures on the fixed platen.

SUMMARY OF THE INVENTION

The primary object of the present invention is to provide an automatic injection blow molding machine of the foregoing type that overcomes the stated problems attendant with such machines. More specifically, a primary object of the present invention is to provide a synchronized and equalized movement between the parison clamps at the parison mold stations and, at the same time, elevate the turret in consort with and by virtue of the synchronized movement but with the turret being lifted only one-half the distance of the movable parison mold halves from the fixed mold halves so that the pins in the indexing of the turret are located at the part line between the open mold halves.

Briefly stated, in a preferred embodiment of an injection blow molding machine in accordance with the present invention, an opposing pair of spaced apart parison mold stations is provided and, at each station, the parison mold clamp is actuated by a toggle linkage with the toggle linkages being commonly actuated by an equalizer bar operated by a hydraulic or air cylinder. The toggle linkage for each parison mold clamp is connected to the upper movable half thereof with the upper movable half for each parison mold station being carried by a common press plate movable rectilinearly and vertically relative to an underlying stationary platen on which the bottom halves of the molds are fixed. The toggle linkage for each mold is arranged vertically with upper links thereof pivotally connected by fixed pivots to a stationary bridge frame and with the lower links thereof pivotally connected by movable pivots to the rectilinearly reciprocable press plate that carries the upper movable mold halves for the parison molds at each parison mold station. The upper and lower links of each toggle linkage for each parison mold are pivotally attached by movable pivots to the horizontally disposed equalizer actuator bar which is axially aligned with and attached to the ram of the operating cylinder. The operating cylinder is disposed outwardly of one of the toggle linkages and is connected by a larger vertically disposed toggle linkage to the bridge frame and the press plate so that as the press plate is moved upwardly it first moves the cylinder outwardly in a lengthwise path and then moves it upwardly in a rectilinear path.

The equalizer bar is formed with an axially extending vertical slot at the point where it overlies an upstanding elevator shaft for the turret with the shaft being slidably disposed by virtue of said slot relative to the bar and having an enlarged upper and lower end overlying and underlying the slot and bearing on top and bottom of the bar respectively. The slot provides a lost motion connection so that the equalizer actuator bar first moves a short distance, under the impetus of the operating ram, in a horizontal rectilinear path which movement is translated by the mold toggle linkages into an initial lifting movement of the press plate and the mold halves without affecting the lowered position of the turret and the attendant placement of the pins in the molds.

As the actuating cylinder moves upwardly the connection between the bar and the turret shaft commences to move the turret upwardly along with the continued lifting of the mold halves. This lifting arrangement ensures that the pins on the turret will be at the part line between the opened mold halves so that when the turret is indexed after being fully elevated the pins will clear the parted mold halves. Not only will the pins clear the parted parison mold halves but they will also clear the separated mold half of the blow molds as the turret is indexed. The determinable one-half movement of the turret is due to the length of the slot in relation to the turret and the position of the bar in relation to the center-pivots of the toggle linkage.

BRIEF DESCRIPTION OF THE DRAWINGS

FIG. 2 is a side elevational view of the machine with portions thereof broken away with one toggle linkage in the mold closed position and the other in phantom lines in the open position.

FIG. 3 is an end elevational view of the machine.

FIG. 4 is a top plan view of the machine with the top having been removed.

FIG. 5 is a top plan view on a larger scale of the platen and the turret.

FIG. 6 is an enlarged longitudinal vertical section view taken substantially on line 6—6 of FIG. 4.

FIG. 7 is a detailed vertical cross-sectional view taken substantially on line 7—7 of FIG. 6.

FIG. 8 is an enlarged top plan view of the top frame portion of the machine.

FIG. 9 is an enlarged end elevational view of the upper half of the machine without the cover housing.

DESCRIPTION OF THE PREFERRED EMBODIMENT

Figure 1:
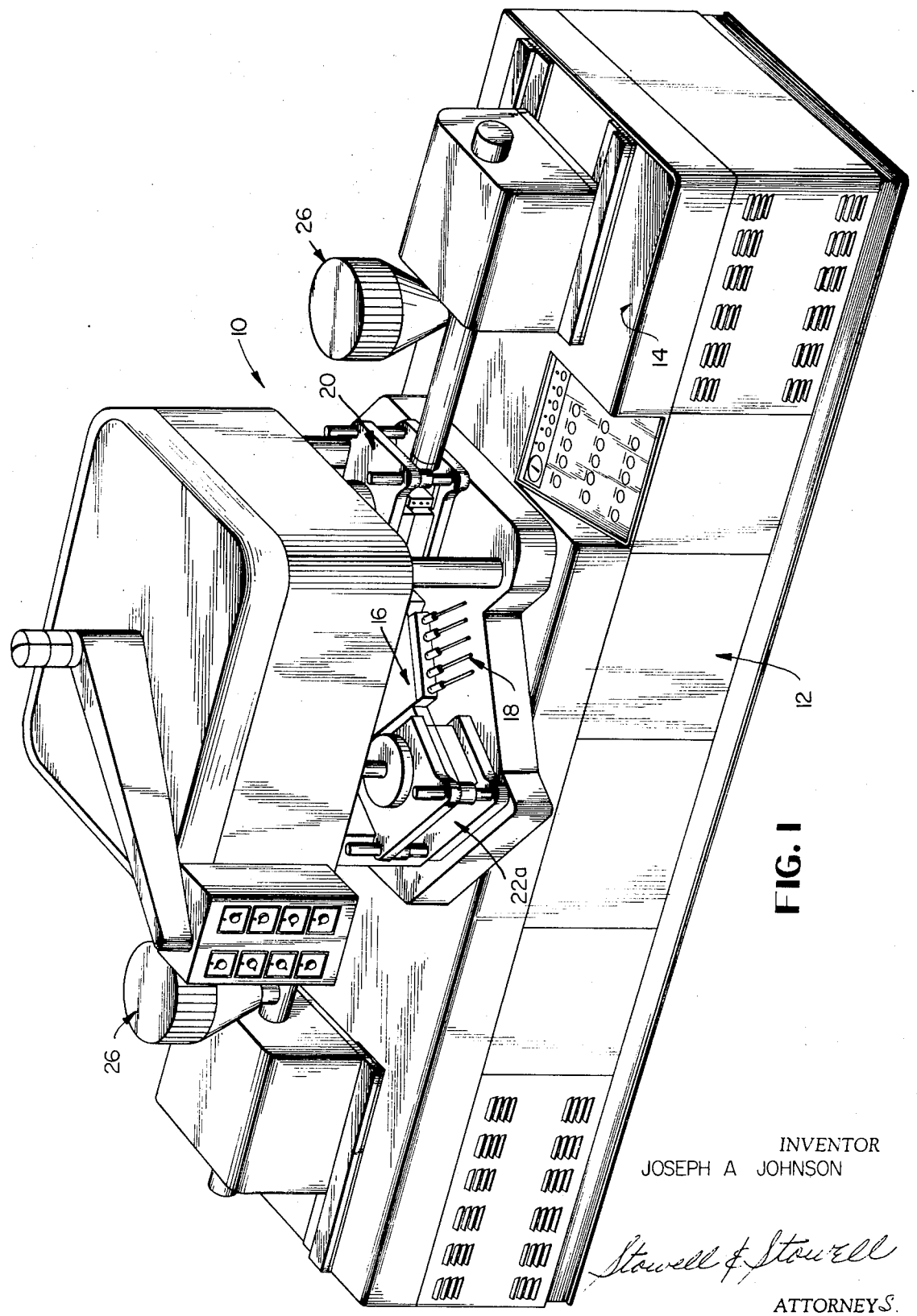
FIG. 1 is a perspective view of an automatic injection blow molding machine formed in accordance with the present invention.

Referring now more particularly to the accompanying drawings, and initially to FIGS. 1, 2, and 5, the injection blow molding machine 10 includes a housing 12 that has an elongated top wall 14 on which are positioned operating stations that angularly surround a rotatable and elevatable turret 16. The turret 16 has side faces from which distinct sets of hollow parison pins 18 project with the turret being surrounded by the stations that are spaced 60° apart. The stations include opposing parison or preform mold stations 20 and 20a, opposing blow mold stations 22 and 22a and opposing ejection stations 24 and 24a. The parison mold stations 20 and 20a are disposed in alignment lengthwise of the machine and are spaced apart along the longitudinal axis of the machine with each station having an injection means 26 operatively associated therewith for injecting plastic melt into the parison molds when they are closed about the parison pins.

Each of the blow mold stations includes a blow mold clamp 28 having mold halves with the bottom half being fixed on the platen 30 and the upper half being carried for vertical opening and closing movement by a vertically oriented cylinder 32, as shown generally in FIG. 2. The construction and operation of the blow mold stations and the ejection stations is similar to that disclosed in my companion application, Ser. No. 52,807, filed of even date herewith and such do not form any particular part of the present invention except by way of environmental background.

The parison or preform mold stations include parison clamps 34 and 36. Each parison clamp comprises a fixed bottom mold half 38 and a movable upper mold half 40. The bottom halves are mounted on the fixed rectangular platen 30 and the upper halves are carried by a vertically reciprocable rectangular press plate 42 that is arranged and mounted to move in a rectilinear path vertically relative to the stationary underlying platen. For this purpose the press plate is provided at its corners with guide collars or sleeves 44 that are slidably sleeved on fixed upstanding posts 46. The platen 30 and the press plate 42 are rectangular and are arranged lengthwise of the machine. The press plate is formed with longitudinal ribbing 48 that is provided symmetrically of the longitudinal center line thereof.

Upstanding from the housing are stationary front and back bridge frames 50 and 52 that extend longitudinally of the machine and are spaced transversely apart between the posts 46, as shown in FIG. 8. The press plate 42 is arranged so that its central portion is positioned between the bridge frames, as shown in FIG. 8. A pair of transverse supporting rods 54 and 56 are fixed between and supported by the bridge frames. The support rods provide fixed pivot supports for vertically disposed toggle linkages 58 and 60 that extend down therefrom to the press plate 42 and by means of which the press plate and, accordingly, the upper mold halves 40 of each parison clamp are raised and lowered.

Each toggle linkage is vertically orientated and includes a pair of upper links 62 and a pair of lower links 64. The upper links are secured at their upper ends by fixed pivots 66 to the central portions of the supporting rods 54 and 56 while the lower links are secured at their lower ends to upstanding ears 68 on the top of the press plate 42 by movable pivots 70, as shown in FIG. 7. At their adjoining ends the upper and lower pairs of links are pivotally attached by movable pivots 72 to a horizontally disposed and longitudinal extending equalizer and actuator arm 74. The arm 74 lies horizontally midway of the toggle linkages 58 and 60 and is axially aligned with and operatively carried by and connected to the ram 76 of a hydraulic or air cylinder 78. The cylinder 78 is horizontally disposed and is attached to and supported by the bridge frames and the press plate through a larger vertically oriented toggle linkage 80, as shown in FIG. 6, 8 and 9.

The cylinder and equalizer arm toggle linkage 80 includes a pair of upper links 82 pivotally connected to the transverse supporting rod 54 by the pivots 66 and a pair of lower links 84 pivotally connected to the press plate 42 by the movable pivots 70. The adjoining ends of the upper and lower links are pivotally connected to the cylinder 78 by movable pivots 86 at the outer closed end portion of the cylinder. The turret 16 has an upstanding elevator shaft 88 and a depending shaft assembly with a rotary actuator (not shown). The turret shaft 88 is disposed vertically through the center of the press plate 42 and has its upper end portion 90 slidably disposed through an axial slot 92 formed vertically through the central portion of the arm 72. The end portion of the turret shaft 88 has its upper end provided with an enlargement 94, in the form of a nut, with such enlargement slidably bearing on the upper surface of the equalizer arm 74. A similar enlargement bears against the lower surface of the arm 74 as shown. The slot in receiving the upper end portion of the turret shaft provides a lost motion connection and motion converter between the actuator arm and the shaft in that the arm 74 can move in a rectilinear path under the pull of the cylinder ram 76. The toggle linkages 58 and 60 are active to raise the press plate and the upper halves of the parison molds and the toggle linkage 80 is also moved outwardly at its center movable pivots 86 to liftingly act on the arm 74 through the pivots 86. This results in an upward movement of the arm 74 and the arm engages the shaft enlargement 94 to pull the shaft and its turret 16 upwardly as the shaft 88 slides in slot 92.

In operations, the toggle linkages 58 and 60 translate the axial reciprocating movement of the equalizer and actuator arm 74, under the impetus of the cylinder ram 76, into up and down equalized movements of the upper mold halves 40 of the parison clamps 34 and 36 at the parison mold stations 20 and 20a. When the mold clamps are lowered and tightened, as shown in FIG. 6, the toggle linkages have their links in line and exert a positive locking action on the parison clamps. The locking force is equalized on the toggle linkages for each parison mold through the equalizer and actuator arm 74. With the toggle linkages 58 and 60 in such locked positions the turret 16 is, of course, in its lowered position and, consequently, the parison pine 18 are located in the closed parison molds into which plastic melt is fed under pressure by the injection units 26.

After the parisons on the pins are properly formed at the preform or parison molds, the cylinder 78 is activated to open the parison mold and to lift the movable upper halves of such molds. The actuation of the cylinder, considering the clamped position of FIG. 6, causes the arm 74 to move toward the right of FIG. 6. Such movement of the arm 74 causes the toggle linkages 58 and 60 to break at the center pivots 72 and to collapse upwardly in a closing scissors movement with the fixed pivot points 66 remaining constant and the press plate being pulled upwardly at the movable pivot points 70. This action results in the raising of the upper movable halves 40 of the parison molds 36 and 38. The turret is also affected by such initial movements of the toggle linkages 58 and 60, but at one-half the rate since the arm 74 slides relative to the turret shaft 88 through the lost motion connection therebetween, and because the bar 74 is connected to the movable pivots 72 between the pair of links 62 and 64 which comprise the toggle linkage 58 or 60.

The turret 16 will only be moved half the distance of the previously moved and still being moved upper mold halves 40. The pins 18 carried by the turret will be disposed at the separation or part line between the parison mold halves and also between the blow mold halves.

It is believed that the foregoing description taken in conjunction with the accompanying drawings will enable the invention to be readily and fully understood by those skilled in the art and, of course, it is to be realized that the foregoing description with its Abstract is merely illustrative of a preferred embodiment of the invention and that many changes and modifications may be made as fall within the true spirit of the invention defined by the attached claims.

What is claimed is:

1. In an injection blow molding machine having a rotatable and elevatable turret carrying parison pins and surrounded by operating stations including an opposing pair of parison mold stations comprised of separable parison molds having fixed lower mold halves and vertically movable upper mold halves; the improvement comprising means clamping the upper mold halves of the parison molds with equal pressure onto the lower mold halves and means actuated by said equalized clamping means for elevating the turret in synchronous movement with the upper mold halves and at a distance one-half the distance of the upper mold halves so that the pins carried by the turret are disposed equidistant with the part line between the mold halves, said upper movable mold halves being raised and lowered by vertically oriented toggle linkages, a horizontally disposed equalizer bar connecting said toggle linkages and an operating ram with which the bar is axially aligned and to which one end of the bar is connected whereby the thrusts of the ram are transmitted by the bar to the toggle linkages and translated thereby into vertical opening and closing movements of the upper mold halves.

2. The invention of claim 1 wherein said turret has an upstanding elevating shaft and said bar is connected to the shaft by a lost motion connection permitting independent axial movement of the bar in transmission of the ram thrusts to the toggle linkages for the mold halves and means is provided between the bar and the shaft operative to lift the shaft and the turret.

3. In an injection blow molding machine having a rotatable and elevatable turret carrying parison pins and surrounded by operating stations including an opposing pair of parison mold stations comprised of separable parison molds having fixed lower mold halves and vertically movable upper mold halves; the improvement comprising means clamping the upper mold halves of the parison molds with equal pressure onto the lower mold halves and means actuated by said equalized clamping means for elevating the turret in synchronous movement with the upper mold halves and at a distance one-half the distance of the upper mold halves so that the pins carried by the turret are disposed equidistant with the part line between the mold halves, said upper mold halves being carried by a common press plate and the lower mold halves being fixed on a common platen, said press plate being mounted for guided vertical reciprocable movement relative to the platen and vertical support frames, said press plate being mounted for sliding movement relative to said support frames, said clamping means including said press plate carrying said upper mold halves and a pair of vertically oriented toggle linkages connecting the press plate to the support frames, each of said toggle linkages having upper links secured by fixed pivots to the support frames and lower links secured by movable pivots to the press plate, said upper and lower links being joined by movable pivots, a horizontally disposed equalizer and actuator bar connected to the joining movable pivots between the links and a horizontal cylinder having a power ram aligned with and connected to the bar for supplying power thrusts to the bar which transmits such thrusts to the toggle linkages for translation into up and down movement of the press plate carrying the upper mold halves.

4. The invention of claim 3 wherein said means for elevating the turret includes a vertical elevator shaft for the turret, said bar having a lost motion connection with said shaft for moving the shaft upwardly after initial movement of the press plate.

5. The invention of claim 4 including a vertically oriented toggle linkage connected by a fixed pivot to the support frame and by movable pivots to the press plate and to the cylinder.

6. The invention of claim 5 wherein said lost motion connection includes said bar having a vertically disposed axially extending slot within which the shaft is slidably disposed, said shaft having an enlargement bearing on the bar and by means of which the lifting force of the bar is transmitted to the shaft.

* * * * *